US012215297B2

(12) United States Patent
Swift

(10) Patent No.: US 12,215,297 B2
(45) Date of Patent: Feb. 4, 2025

(54) METHOD FOR IMPARTING A CUSTOMIZED COFFEE AND CREAMER AROMA TO AN ENVIRONMENT, AN AROMA CUSTOMIZING COFFEE BAR, AND A COFFEE BAR KIT

(71) Applicant: Gena Swift, Princeton, IN (US)

(72) Inventor: Gena Swift, Princeton, IN (US)

( * ) Notice: Subject to any disclaimer, the term of this patent is extended or adjusted under 35 U.S.C. 154(b) by 0 days.

(21) Appl. No.: 18/452,444

(22) Filed: Aug. 18, 2023

(65) Prior Publication Data

US 2024/0067896 A1 Feb. 29, 2024

Related U.S. Application Data

(60) Provisional application No. 63/373,395, filed on Aug. 24, 2022.

(51) Int. Cl.
*C11C 5/00* (2006.01)

(52) U.S. Cl.
CPC .............. *C11C 5/002* (2013.01); *C11C 5/008* (2013.01)

(58) Field of Classification Search
CPC ................................ C11C 5/002; C11C 5/008
USPC ............................................................ 44/275
See application file for complete search history.

(56) References Cited

U.S. PATENT DOCUMENTS 9,309,026 B2 * 4/2016 Propes ..................... B65D 1/36
10,039,851 B2 8/2018 Tschantz et al.
2006/0272199 A1 * 12/2006 Licciardello ............ C11C 5/002 44/275
2007/0169404 A1 * 7/2007 Cagle ...................... C11C 5/008 44/275
2009/0310504 A1 12/2009 Worthen et al.
2013/0084535 A1 * 4/2013 Braun ..................... C11C 5/002 431/2
2014/0170578 A1 * 6/2014 Leach ..................... C11C 5/002 264/279
2015/0209463 A1 * 7/2015 Tschantz ................ B65D 25/04 434/365
2017/0260478 A1 * 9/2017 Sutton, Jr. ............... C11C 5/002
2018/0312778 A1 * 11/2018 Campbell ............... C11C 5/006

FOREIGN PATENT DOCUMENTS

WO WO2014-144636 9/2014

OTHER PUBLICATIONS

Screenshot from https://happywax.com/ obtained Aug. 23, 2022 (1 page).

* cited by examiner

*Primary Examiner* — Ellen M McAvoy
(74) *Attorney, Agent, or Firm* — Allison Johnson, P.A.; Allison Johnson

(57) ABSTRACT

Disclosed is a method of imparting a customized aroma of coffee and creamer to an environment. The method includes placing coffee-scented wax melts and creamer-scented wax melts on a surface and heating the surface to a temperature sufficient to melt the coffee-scented wax melts and the creamer-scented wax melt and to impart a desired customized aroma of coffee and creamer to an environment.

20 Claims, 2 Drawing Sheets

METHOD FOR IMPARTING A CUSTOMIZED COFFEE AND CREAMER AROMA TO AN ENVIRONMENT, AN AROMA CUSTOMIZING COFFEE BAR, AND A COFFEE BAR KIT

CROSS REFERENCE TO RELATED APPLICATIONS

This application claims the benefit of U.S. Provisional Application No. 63/373,395, filed on Aug. 24, 2022, and incorporated herein.

BACKGROUND

The invention is directed to customizing an aroma of coffee and creamer in an environment.

Wax melts are relatively small pieces of molded wax that include a scent and sometimes a colorant. Wax melts are often placed on the surface of a wax warmer and allowed to melt. As the pieces of wax melt, they give off an aroma. A variety of wax warmers are used in conjunction with wax melts including electric warmers (e.g., crock pots, plug in warmers, and electric warmers) and warmers that are made out of ceramic and heated from underneath using a variety of heat sources including, e.g., a light bulb or a small candle (e.g., a tea light candle).

Scented wax melts and candles give off a scent that is determined when the melt or candle is manufactured. People have unique scent preferences. Many people find the scent emitted by pre-scented wax melts and candles to be too strong, too weak, or undesirable.

There is a need for customizing the aroma created when wax melts are heated.

SUMMARY

In one aspect, the invention features a method of imparting a customized aroma of coffee and creamer to an environment, the method including placing coffee-scented wax melts on a surface, adding a creamer-scented wax melt to the coffee-scented wax melts, and heating the surface to a temperature sufficient to melt the coffee-scented wax melts and the creamer-scented wax melt and to impart a customized aroma of coffee and creamer to an environment.

In another aspect, the invention features a method of imparting a customized aroma of coffee and creamer to an environment, the method including placing a creamer-scented wax melt on a surface, adding a coffee-scented wax melt to the creamer-scented wax melt, and heating the surface to a temperature sufficient to melt the creamer-scented wax melt and the coffee-scented wax melt and to impart a customized aroma of coffee and creamer to an environment.

In one embodiment, the method further includes adjusting the aroma to a further customized aroma by adding at least one more scented wax melt to the melt.

In another embodiment, the heating includes heating the coffee-scented wax melt prior to adding the creamer-scented wax melt.

In other embodiments, the heating includes heating the creamer-scented wax melt prior to adding the coffee-scented wax melt.

In some embodiments, the heating includes simultaneously heating the coffee-scented wax melt and the creamer-scented wax melt.

In one embodiment, adding the creamer-scented wax melt includes adding a plurality of creamer-scented wax melts to the coffee-scented wax melts.

In other embodiments, the creamer-scented wax melts exhibit a generally rhombohedron shape.

In another embodiment, the creamer-scented wax melt exhibits a generally rhombohedron shape.

In some embodiments, each coffee-scented wax melt exhibits a coffee bean shape.

In one embodiment, the coffee-scented wax melt is in the form of a plurality of coffee bean-shaped wax melts, each coffee bean-shaped wax melt weighs no greater than 15 grams (g). In another embodiment, the coffee-scented wax melt is in the form of a plurality of coffee bean-shaped wax melts, each coffee bean-shaped wax melt weighs no greater than 7 g. In other embodiments, the coffee-scented wax melt is in the form of a plurality of coffee bean-shaped wax melts, each coffee bean-shaped wax melt weighs no greater than 5 g. In some embodiments, the coffee-scented wax melt is in the form of a plurality of coffee bean-shaped wax melts, each coffee bean-shaped wax melt weighs no greater than 1 g. In other embodiments, the coffee-scented wax melt is in the form of a plurality of coffee bean-shaped wax melts, each coffee bean-shaped wax melt weighs from 0.5 g to 1 g.

In one embodiment, each creamer-scented wax melt weighs no greater than 15 g. In other embodiments, each creamer-scented wax melt weighs no greater than 7 g. In some embodiments, each creamer-scented wax melt weighs no greater than 5 g. In another embodiment, each creamer-scented wax melt weighs from 1.5 g to 7 g. In other embodiments, each creamer-scented wax melt weighs from 1.5 g to 5 g. In another embodiment, each creamer-scented wax melt weighs no greater than 2.5 g. In some embodiments, each creamer-scented wax melt weighs from 1.5 g to 2.25 g.

In another aspect, the invention features a coffee and creamer aroma customizing coffee bar that includes at least one container that includes a plurality of coffee-scented wax melts, and at least one container that includes a plurality of creamer-scented wax melts. In one embodiment, the coffee bar further includes a wax warmer for melting the wax melts. In other embodiments, the coffee-scented wax melts are in the form of coffee bean-shaped wax melts and each coffee bean-shaped wax melt weighs no greater than 5 g, or even no greater than 1 g. In another embodiment, the coffee-scented wax melts are in the form of coffee bean-shaped wax melts and each coffee bean-shaped wax melt weighs from 0.5 g to 5 g, or even from 0.5 g to 0.8 g.

In other aspects, the invention features a kit that includes a first package including a plurality of coffee-scented wax melts, and a second package comprising a plurality of creamer-scented wax melts. In one embodiment, the kit further includes a wax warmer. The invention features a unique method of customizing the coffee and creamer aroma present in an environment.

Other features and advantages will be apparent from the following brief description of the drawings, description of the preferred embodiments, and from the claims.

GLOSSARY

Figure 1:
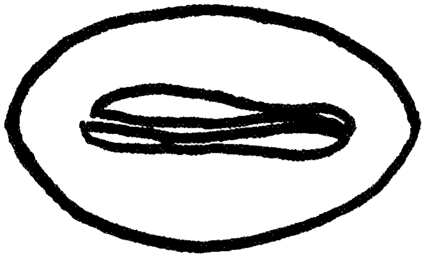
FIG. 1 is a top plan view of one embodiment of a coffee-scented wax melt in the general shape of a coffee bean.

In reference to the invention, these terms have the meanings set forth below:

The phrase "coffee bean shape" refers to a shape that is recognizable to a viewer as representative of a coffee seed or a coffee peaberry.

The phrase "wax warmer" refers to any article that includes a heating surface, which is a surface that is heated by a heat source.

The phrase "individual wax warmer" refers to a wax warmer that is sized and manufactured for use by an individual person.

DETAILED DESCRIPTION

The method of imparting a customized aroma to an environment utilizes coffee-scented wax melts and creamer-scented wax melts. The method includes placing either coffee-scented wax melts or creamer-scented wax melts on the heating surface of a wax warmer, adding a differently scented wax melt to the existing wax melt, and warming the heating surface to a temperature sufficient to allow the wax melts to melt and to release an aroma of coffee and creamer. Placing the different type of wax melts on the heating surface of the wax warmer can occur in any desired sequence including first placing coffee-scented wax melts on the heating surface and then adding creamer-scented wax melts to the coffee-scented wax melts, first placing creamer-scented wax melts on the heating surface and then adding coffee-scented wax melts to the creamer-scented wax melts, simultaneously placing both coffee-scented wax melts and creamer-scented wax melts on the heating surface of the wax warmer, and combinations thereof. Additional pieces of the same or different coffee-scented wax melts, creamer-scented wax melts, and combinations thereof can be added to the melt by the user until the desired aroma is achieved. The aroma can be customized and altered by the user to suite the user's own preference by controlling the number and amount of each type of wax melt placed on the surface of the wax warmer or added to the wax melt.

In one embodiment, the method includes placing coffee-scented wax melts on the heating surface of a wax warmer, adding creamer-scented wax melts to the coffee-scented wax melts, and then heating the surface of the wax warmer to allow the wax melts to melt and release a coffee and creamer aroma.

In another embodiment, the method includes placing creamer-scented wax melts on the heating surface of a wax warmer, adding coffee-scented wax melts to the creamer-scented wax melts, and then heating the surface of the wax warmer to allow the wax melts to melt and release a coffee and creamer aroma.

The heating of the heating surface of the wax warmer can occur at any desired time and in any desired sequence including, e.g., prior to placing a wax melt on the heating surface, while placing a wax melt on the surface, after placing a wax melt on the heating surface, and combinations thereof.

Optionally a liner optionally is placed on the heating surface of the wax warmer such that the liner is positioned between the wax melts and the warmer surface. The heating surface optionally is made from silicone or includes a silicone-coated surface.

Wax Melts

The wax melts include wax, at least one scent, and optionally a colorant (e.g., synthetic dye, natural dye, pigment, and combinations thereof). Useful waxes include, e.g., soy wax, paraffin wax, beeswax, coconut, and palm wax, and combinations thereof.

Coffee-Scented Wax Melts

Figure 2:
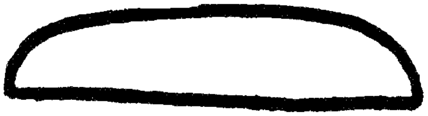
FIG. 2 is a side view of the coffee-scented wax melt of FIG. 1.
Figure 3:
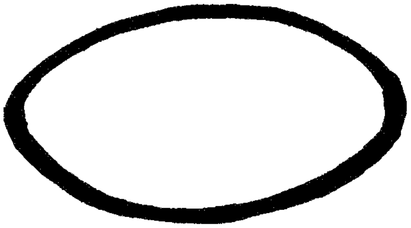
FIG. 3 is a bottom plan view of the coffee-scented wax melt of FIG. 1.

The coffee-scented wax melts can exhibit any desired shape including, e.g., elliptical, hemispherical, spherical, and cuboid. Preferably the coffee-scented wax melts include the coffee bean "center cut" on one side. Some useful coffee-scented wax melts are of the general shape exhibited by a coffee bean found in nature (i.e., the seed of a *Coffea* plant) when two stones are present in the fruit of the *Coffea* plant or when a single stone is present in the fruit of the *Coffea* plant, which is called a "peaberry". Both of these types of seeds are commonly referred to as coffee beans. In nature, the center cut is often present on a relatively flat surface of the bean due to the surfaces of two seeds pressing against each other as the seeds form in the *Coffea* fruit. When the Peaberry is formed there is no force acting to flatten one surface of the seed such that the "center cut" of the Peaberry is present on a more arcuate or rounded surface of the Peaberry. Useful coffee-scented wax melts can exhibit features, shapes, and sizes similar or identical to those exhibited by coffee beans found in nature. One embodiment of a useful coffee bean-shaped wax melt is illustrated in FIGS. 1-3.

Other useful coffee bean-shaped wax melts include one relatively flat side and a coffee bean "center cut" on the opposite side. Another useful coffee bean-shaped wax melt includes an elliptical mound (e.g., ellipsoidal) on one side, a flat surface on the side opposite the elliptical mound side, and a center cut generally at the center of the mound. The center cut extends across a major portion of the length of the elliptical mound and into a portion of the depth of the mound.

The coffee-scented wax melts can exhibit any desired size. Preferably the coffee-scented wax melts are sufficiently small so as to enable the user to more specifically customize the aroma achieved when the coffee-scented wax melts are combined with the creamer-scented wax melts. Useful coffee-scented wax melts include wax melts having a weight of no greater than 15 grams (g), no greater than 7 g, no greater than 5 g, no greater than 1 g, from 0.5 g to 15 g, from 0.5 g to 7 g, from 0.5 g to 5 g, from 0.5 g to 1 g, from 0.5 g to 0.7 g, or even from 0.55 g to 0.65 g. Preferably each coffee-scented wax melt weighs from 0.5 g to 5 g, from 0.5 g to 1 g, more preferably from 0.5 g to 0.7 g, or even most preferably from 0.55 g to 0.65 g to enable the user to control the customization of the aroma using smaller increments of the wax melt.

Coffee Scent

A coffee-scented wax melt is a wax melt that includes only a scent or scents associated with a coffee bean and is free from scents associated with other sources. Preferred coffee-scented wax melt includes a single coffee scent so as to allow the user to more specifically customize the aroma achieved when the wax melts and when the coffee-scented wax melt is combined with a creamer-scented wax melt. A scent associated with a coffee bean is a scent similar to, or identical to, a coffee bean (e.g., a fresh coffee bean, a roasted coffee bean, a light roasted coffee bean, a dark roasted coffee bean, a ground coffee bean, and combinations thereof), a scent emitted by coffee, roasted coffee, light roasted coffee, dark roasted coffee, espresso, and combinations thereof, a scent emitted when roasting or brewing coffee beans that originate from a variety of countries including, e.g., Brazil, Africa, Asia, Ethiopia, Sudan, and Cameroon, a scent emitted when roasting or brewing Arabica coffee beans (*Coffea arabica*), Robusta coffee beans (*Coffea canephora*), and combinations thereof, and combinations thereof.

The coffee-scented wax melt can exhibit a variety of colors but preferably exhibits a color similar to that of a roasted coffee bean. Useful colors include, e.g., brown, caramel, black, and combinations thereof, and varies hues and shades thereof.

Creamer-Scented Wax Melts

Figure 4:
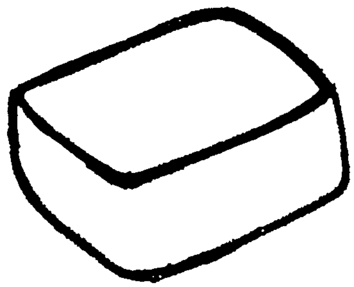
FIG. 4 is a top perspective view of one embodiment of a creamer-scented wax melt in the shape of a rhombohedron with rounded corners.
Figure 5:
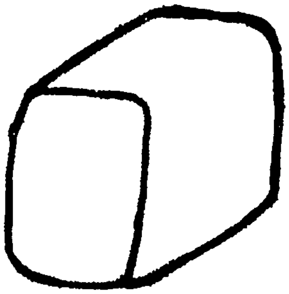
FIG. 5 is a side perspective view of the creamer-scented wax melt of FIG. 4.

The creamer-scented wax melts can exhibit any desired shape. Useful shapes for the creamer-scented wax melts include, e.g., cubes, cuboids, rhombohedrons, rectangular prisms, triangular prisms, tetrahedrons, octahedrons, dodecahedrons, pentagonal prisms, square pyramid, pentagonal pyramids, hexagonal pyramids, hexagonal prism, spheres, hemispheres, cones, frustoconical shapes, cylinders, toroids, ellipsoids, and combinations thereof. The creamer-scented wax melt can generally exhibit any of the aforementioned shapes, which means that the creamer-scented wax melt exhibits the shape but also includes slightly curved or arcuate corners. One embodiment of a useful rhombohedron-shaped creamer-scented wax melt is illustrated in FIGS. 4 and 5.

The creamer-scented wax melts can exhibit any desired size. Preferably the creamer-scented wax melts are sufficiently small so as to enable the user to more specifically customize the aroma achieved when the creamer-scented wax melts are combined with the coffee-scented wax melts. Useful creamer-scented wax melts include wax melts that weigh no greater than 15 g, no greater than 7 g, no greater than 5 g, no greater than 2.5 g, no greater than 2.25 g, from 1.5 g to 15 g, from 1.5 g to 7 g, from 1.5 g to 5 g, from 1.5 g to 2.5 g, from 1.5 g to 2.25 g, from 1.5 g to 2.1 g, or even from 1.6 g to 2.1 g. Preferably each creamer scented wax melt weighs from 1.5 g to 2.5 g, from 1.5 g to 2.25 g, more preferably from 1.5 g to 2.1 g, or even most preferably from 1.6 g to 2.1 g to enable the user to control the customization of the aroma using smaller increments of the wax melt.

Creamer Scent

The creamer-scented wax melt includes at least one creamer scent and preferably includes a single creamer scent to enable the user to more specifically customize the aroma achieved when the wax melts melt and when the creamer-scented wax melts are combined with the coffee-scented wax melts. Useful creamer scents include, e.g., almond, amaretto, butter pecan, butterscotch, bourbon, caramel, chocolate, chocolate almond, cinnamon spice, coconut, toasted coconut, cream, creme brulee, creme de menthe, dulce de leche, French vanilla, graham cracker, hazelnut, honey, mint, mocha, molasses, orange, peanut, pecan, peppermint, pumpkin, pumpkin spice, raspberry, rum, snickerdoodle, toffee, vanilla, vanilla cream, whiskey, and combinations thereof.

The creamer-scented wax melts optionally exhibit a color and include a colorant. Useful colorants include, e.g., synthetic dyes, natural dyes, pigments, and combinations thereof. The creamer-scented wax melts can exhibit any desired color including, e.g., white, cream, caramel, brown, green, yellow, orange, and combinations thereof.

Other embodiments are within the claims. Although the coffee-scented wax melt has been described and exhibiting a coffee bean-like shape, the coffee-scented wax melt alternatively can exhibit any useful shape including any of the shapes described above in relation to the creamer-scented wax melt.

The coffee-scented wax melts and the creamer-scented wax melts optionally are contained within a container prior to use. Any suitable packaging can be used as the container. Useful packaging substrates include, e.g., polymer film, paper, cardboard, glass, metal, and combinations thereof. Useful package containers include, e.g., bags, pouches, cartons, boxes, tins, and combinations thereof.

Coffee Bar

The coffee-scented wax melts and the creamer-scented wax melts optionally are positioned to form a coffee bar. The coffee-scented wax melts and the creamer-scented wax melts are provided in different locations in the coffee bar, preferably in containers, such that a user can select coffee-scented wax melts from one position (e.g., one container) in the coffee bar and creamer-scented wax melts from another position (e.g., another container) in the coffee bar. In some embodiments, the coffee bar includes a number of differently scented coffee-scented wax melts and a number of differently scented creamer-scented wax melts. The differently scented melts are positioned at different locations in the coffee bar and the user selects from the differently scented coffee-scented wax melts and the differently scented creamer-scented wax melts to achieve a combination that imparts a desired aroma to the environment when the melts are melted. The coffee bar optionally additionally includes a wax warmer. The user can select the wax warmer, select the desired combination of wax melts, and apply the wax melts to the heating surface of the wax warmer, where the melts are allowed to melt and emit an aroma.

Kit

The coffee-scented wax melts and the creamer-scented wax melts optionally are provided in a kit that optionally additionally includes a wax warmer. The kit includes a package of coffee-scented wax melts, a package of creamer-scented wax melts, optionally instructions explaining that the coffee-scented wax melts and the creamer-scented wax melts can be combined and melted to impart a desired aroma to an environment, and optionally a wax warmer.

Wax Warmers

A wax warmer is a device that is used by an individual. The wax warmer can be used in a variety of environments including, e.g., environments such as living quarters (e.g., a home, apartment, condominium, tent, and motor home), businesses (e.g., a shop, a restaurant, and an office), and combinations thereof. Useful wax warmers include a heating surface and a heat source, e.g., an electric heat source (e.g., a light bulb, a ceramic heater that is built in to the warmer, a heater such as that used to warm the bottom of a vessel such as a coffee cup, and a heat source in a warmer that plugs into an electrical outlet), or a fire heat source (e.g., a candle), which heats the surface on which the wax melts are to be placed for melting (the heating surface of the wax warmer). Crock pots (e.g., mini crock pots) also can be used as wax warmers. Wax warmers for individual use often have a heating surface of any suitable shape (e.g., planar, arcuate, circular, elliptical, parallelogram, and combinations thereof) and dimension including, e.g., at least one dimension that is from 0.5 inch to 10 inches, from 1 inch to 5 inches, from 1 inch to 3 inches, or even from 1 inch to 2 inches. Wax warmers are commercially available from a variety of manufacturers including, e.g., under the Candle Warmers Etc.

brand from Candle Warmers Etc. Corp. (Draper, Utah), under the EL Earnest Living brand from Jason Craft Corp. (Taipei City, Taiwan), and under the Happy Wax trade designation from Bootstrap Brands, Inc. (Durham, North Carolina).

In use, the wax warmer is activated (e.g., turned on in the case of electric warmers or lit in the case of a flame-based warmer), the heat generated by the heat source melts the wax melts, and the melting wax melts release an aroma. After use, the wax warmer is turned off and the remaining used wax is allowed to cool. After the used wax has cooled and solidified it can be removed from the heating surface.

What is claimed is:

1. A method of imparting a customized aroma of coffee and creamer to an environment, the method comprising:
- placing coffee-scented wax melts on a surface;
- adding a creamer-scented wax melt to the coffee-scented wax melts; and
- heating the surface to a temperature sufficient to melt the coffee-scented wax melts and the creamer-scented wax melt and to impart a customized aroma of coffee and creamer to an environment.

2. The method of claim 1 further comprising adjusting the aroma to a further customized aroma by adding at least one more scented wax melt to the melt.

3. The method of claim 1, wherein the heating comprises heating the coffee-scented wax melt prior to adding the creamer-scented wax melt.

4. The method of claim 1, wherein the heating comprises simultaneously heating the coffee-scented wax melt and the creamer-scented wax melt.

5. The method of claim 1, wherein adding the creamer-scented wax melt comprises adding a plurality of creamer-scented wax melts to the coffee-scented wax melts.

6. The method of claim 1, wherein the creamer-scented wax melt exhibits a generally rhombohedron shape.

7. The method of claim 1, wherein each coffee-scented wax melt exhibits a coffee bean shape.

8. The method of claim 1, wherein the coffee-scented wax melts are in the form of coffee bean-shaped wax melts, each coffee bean-shaped wax melt weighing no greater than 5 g.

9. The method of claim 1, wherein the coffee-scented wax melts are in the form of coffee bean-shaped wax melts, each coffee bean-shaped wax melt weighing from 0.5 g to 1 g.

10. The method of claim 1, wherein the creamer-scented wax melt weighs no greater than 7 g.

11. The method of claim 1, wherein the creamer-scented wax melt weighs no greater than 5 g.

12. The method of claim 1, wherein the creamer-scented wax melt weighs from 1.5 g to 7 g.

13. The method of claim 1, wherein the creamer-scented wax melt weighs from 1.5 g to 5 g.

14. The method of claim 1, wherein the creamer-scented wax melt weighs from 1.5 g to 2.25 g.

15. The method of claim 1, wherein the surface is the heating surface of an individual wax warmer.

16. A coffee and creamer aroma customizing coffee bar comprising:
- at least one first container comprising a plurality of coffee-scented wax melts; and
- at least one second container comprising a plurality of creamer-scented wax melts.

17. The aroma customizing coffee bar of claim 16 further comprising a wax warmer for melting the wax melts.

18. A method of using the aroma customizing coffee bar of claim 16, the method comprising
- selecting at least one coffee-scented wax melt from the first container;
- placing the at least one coffee-scented wax melt on a heating surface of a wax warmer;
- selecting at least one creamer-scented wax melt from the second container;
- placing the creamer-scented wax melt to the heating surface of the wax warmer; and
- heating the surface of the wax warmer to a temperature sufficient to melt the coffee-scented wax melt and the creamer-scented wax melt and to impart a customized aroma of coffee and creamer to an environment.

19. A kit comprising:
- a first package comprising a plurality of coffee-scented wax melts; and
- a second package comprising a plurality of creamer-scented wax melts.

20. The kit of claim 18 further comprising an individual wax warmer.

* * * * *